Feb. 18, 1930.   J. KOZMA   1,747,250
LOCK NUT
Filed Feb. 29, 1928
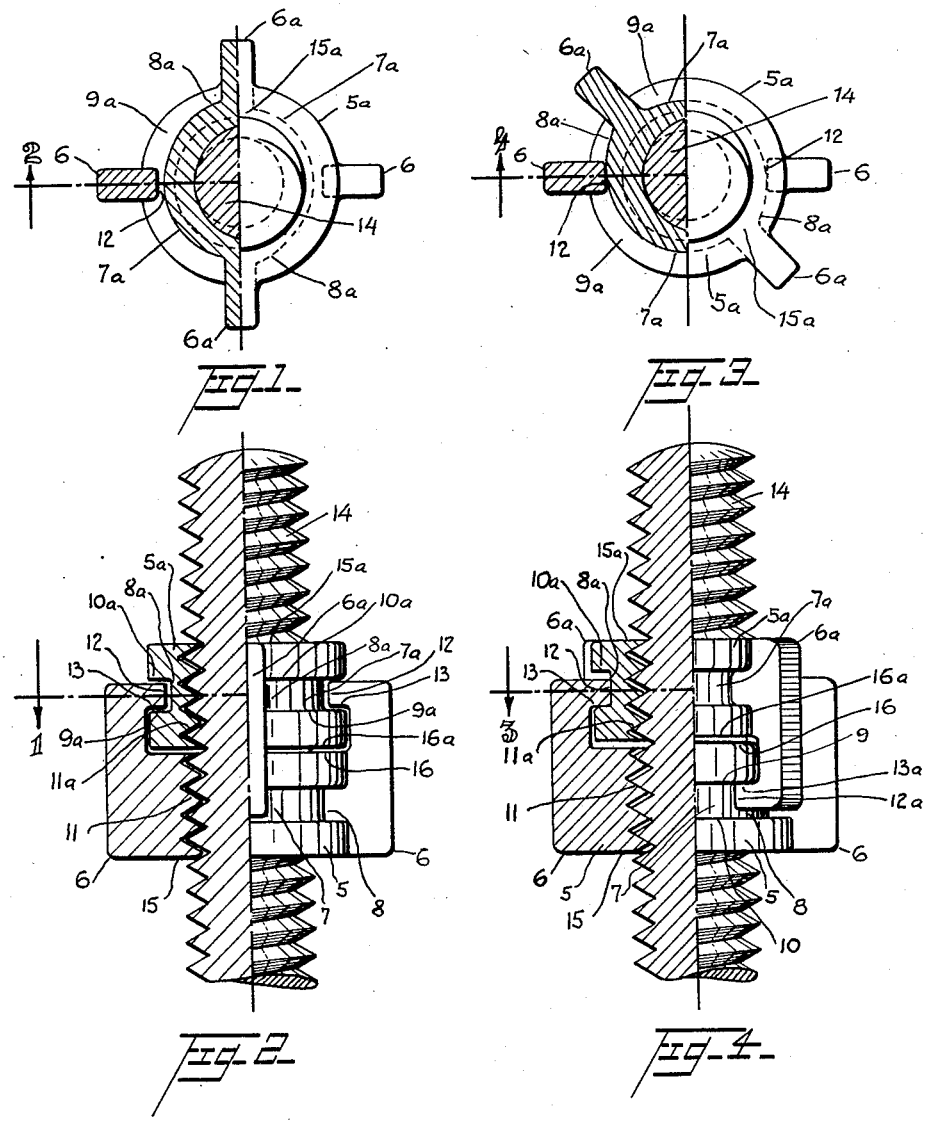
INVENTOR.
JOSEPH KOZMA
BY Rudolf Wildermann
his ATTORNEY.

Patented Feb. 18, 1930

1,747,250

UNITED STATES PATENT OFFICE

JOSEPH KOZMA, OF NEW YORK, N. Y.

LOCK NUT

Application filed February 29, 1928. Serial No. 257,828.

My improvements relate to nuts which are to be fastened or locked at a certain point along a screw, where they secure a certain part in its position relative to the screw, where a certain motion is to be checked at a certain point along the screw, where a certain length is to be set for measurements, in fact in any place, where a locking in position or an adjustable setting is desired. My device is primarily adapted where this is to be done quickly, by hand, without auxiliary tools, and correspondingly the objects of my invention are:

1st, a nut which by manipulation can be set upon or moved along a screw.

2nd, to provide a locknut unit which can be turned back and forth along a screw by hand operation.

3rd, to be able to set my lock-nuts by one hand or the grip of its fingers at any place along a screw.

4th, to have means for locking on a screw which represent one unseparable unit when on or off a screw.

5th, to provide lock-nuts which can be set more or less permanently along a screw, according to the pressure applied by the hand in setting.

6th, to provide two nuts assembled in a locknut unit, which cannot be loosened by blows upon the faces of the unit.

I attain these objects by the parts illustrated in the accompanying drawing in which:—

Figures 1 and 2 show top and side views, respectively, of my locknuts as they rest upon a screw when not locked.

Figures 3 and 4 show top and side views, respectively, of my nut unit when locked upon a screw.

All figures are bisected. The left halves of all figures show sections taken along lines and seen in the directions indicated in the other views.

Similar numerals refer to similar parts throughout the several views. Two similar nuts form the parts of my invention and similar numerals apply to corresponding parts on these two nuts. But to the numerals relating to the parts of one of these nuts the index "a" has been attached, to facilitate distinction between the two nuts thruout the various views.

In all figures the nut 5 with wings 6 is shown in the same position. Nut $5^a$ with wings $6^a$ is a duplicate of nut 5 and is shown in a position coaxially upside down. This nut $5^a$ is in different positions in respect to nut 5 in the open (Figures 1 and 2) and closed (Figures 3 and 4) positions. Its wings $6^a$ stand at right angles to those of nut 5 in Figures 1 and 2; but these wings are disposed at an acute angle in Figures 3 and 4, nut $5^a$ having been correspondingly turned in counterclockwise direction from the position in Figure 1 to that of Figure 3.

In the cylindrical surfaces of the nuts are grooves extending from wing to wing. The bottoms 7 and $7^a$ of these grooves are cylindrical and concentric to the nuts for part of the circumference but they are slightly spirally disposed at one end, 8 and $8^a$. The sides of these grooves are shown as disposed at substantially right angles to their base, but sides of any shape and angle of disposition which will present a suitable surface for frictional contact with the wings, may equally well be used.

The sides of the grooves, 9 and 10, and $9^a$ and $10^a$, respectively are slightly helically disposed in a direction opposed to the lead of the thread on the inside of the nuts. Corresponding sides of the V-thread in said nuts 5 and $5^a$ are denominated 11 and $11^a$ respectively.

The wings of each of the nuts 5 and $5^a$ extend over and clear the body of the other nut respectively; they carry teeth at their ends which with their crowns 12 and $12^a$, and inside faces 13 and $13^a$, abut upon the bottoms $7^a$ and 7, and the sides $9^a$ and 9 of the other nuts $5^a$ and 5 respectively.

The screw upon which my improvement is mounted is part 14. The faces on the ends of the nuts are designated as 15 and $15^a$; the other ends 16 and $16^a$ face each other.

In the manufacture of my improved locknuts I prepare the individual nuts with the extensions of the wings spread apart, so that the crowns of the teeth clear the outside diameter of the nuts to be assembled with them; after the nuts are brought together the wings are pressed in so that the teeth of one nut engage the groove of the other, as shown.

The clearance spaces between the threads in the nuts and the screw have been exaggerated, as well as in places where other faces abut, to emphasize the contrast between the open and the locked positions and to illustrate in general the functions of my invention.

In the position of Figures 1 and 2, and when in Figure 1 the nut 5ᵃ is turned clockwise, even as far as to push wing 6ᵃ against wing 6, the two nuts are in unlocked relation and can easily be fed by hand back and forth on the screw, or, vice versa, the screw may be turned in those nuts. The clearance and cooperative relation of parts by which I obtain such free movement is illustrated in Figure 2.

But when nut 5ᵃ is turned in counterclockwise direction to its position in Figure 3, or further, it moves along the lead of the screw away from nut 5 until faces 13ᵃ abut against the sides 9 of the grooves in nut 5, simultaneously faces 13 on the wings of nut 5 frictionally engage the sides 9ᵃ of the grooves in nut 5ᵃ and reactionally the sides 11 and 11ᵃ of the threads in the nuts are drawn against and frictionally engaged by the abutting sides of the thread on screw 14: the nuts are locked.

To increase, in the locked position, the extent to which the nuts are frictionally engaged, and to increase the firmness of the lock in coaxially securing the nuts by the abutment of tangentially disposed faces, the spirally disposed ends 8 and 8ᵃ of the bottoms of the grooves are frictionally engaged by the crowns 12ᵃ and 12 of the teeth on the ends of the wings simultaneous with said frictional engagement of the sides 13ᵃ and 13 of said teeth with the sides 9 and 9ᵃ of the grooves.

The degree to which the helical rise of the sides of the grooves is opposed to the lead of the screw determines the abruptness with which the nuts lock. The relative angular displacement of the nuts required to cause locking is a function of the clearance between the abutting faces when unlocked, and the difference between the pitches of the helical groove and of the screw is limited by the amount of play the wings of one nut have between those of the other. For certain purposes I may have the sides of the grooves perpendicular to the axis or even helically disposed in the direction of the lead of the screw 14. When I make the pitch of the helix of the sides of the grooves the same as the pitch of the screw, I can, of course, not lock the nuts any more by turning one away from the other, but in that case I may jam them together like ordinary lock-nuts, the faces 16 and 16ᵃ frictionally engaging each other.

I may use my invention for this kind of locking; but, generally, the locking by turning one nut away from the other is preferable. When they are thus locked, pressure against one of the faces 15 and 15ᵃ will not decrease the frictional contact between the nut which is pressed and the screw, but that contact becomes closer, whereas in the case of ordinary lock-nuts, such pressure releases the grip of the pressed nut upon the screw, and thus a loosening of the lock may be caused by any rotational momentum upon the pressed nut.

But another important advantage of the preferred way of locking is the ease of manipulation of the lock-nuts; with suitably shaped wings the operation of my device,—moving it along the screw and locking it in the desired position,—will be performed as easily as if an ordinary wing nut is just shifted along the screw.

My device may also be used with one or more than two wings on each nut; in the latter case the wings on one of the nuts may be omitted and other means for the manipulation of that nut may be substituted. There may also be one or two wings on each one of the nuts, and, additionally, fingers or hooks between said wings, which engage the other nut in the manner of the wings.

It is also understood that the sides 10 and 10ᵃ on the grooves are not essential. The groove may even be omitted altogether, the teeth hinging over the faces 15 and 15ᵃ, of the other nuts, respectively.

I claim:

1. Locknuts of the kind described, comprising two separately, relatively rotatable nuts, having arcuate, substantially parallel circumferential grooves in the peripheries of said nuts, helically disposed sides defining said grooves, spirally disposed protrusions in the bottom of said grooves, and separate wings on the peripheries of said nuts, the ends of said wings on the periphery of each of said nuts registering in the grooves in the other of said nuts, and being in slidable and locking engagement with the bottoms and helically disposed sides thereof.

2. In a locknut, the combination of two separately, relatively rotatable nuts, a threaded portion on the interior periphery of each of said nuts, similarly arcuate, coaxial, substantially parallel circumferential grooves in the exterior periphery of each of said nuts, helically disposed opposite sides lying in substantially parallel planes defining said grooves on each of said nuts, a spirally disposed protrusion in one end of the bottom of each of said grooves, a plurality of substantially diametrically oppositely disposed independent wings, on the exterior periphery of each of said nuts, extending from each nut in opposite directions, parallel to the axis of said nuts, to the grooves on the other nut, a tongue on the end of each of said wings on each of said nuts, registering in the grooves in the other of said nuts, and being in rotarily slidable engagement with the bottoms and helically disposed sides of said grooves, and adapted to lock said nuts in fixed relation to each other, and to a bolt, by relative rotation of said nuts in one direction and to unlock said nuts for free rotation relatively to each other and on said bolt, by relative rotation in the opposite direction.

3. Locknuts of the kind described, comprising two separately, relatively rotatable nuts, having arcuate, substantially parallel circumferential grooves in the peripheries of said nuts, annular flanges around the peripheries of the adjacent faces of said nuts, defining one side of said grooves, and separate wings on the periphery of each of said nuts, slidably and lockably registering in said grooves and engaging with the flanges in and on the other of said nuts.

4. Locknuts of the kind described, comprising two separately, relatively rotatable nuts, having arcuate, substantially parallel circumferential grooves in the peripheries of said nuts, annular flanges around the peripheries of the adjacent faces of said nuts, helically disposed faces on one side of said flanges defining one side of said grooves, and separate wings on the periphery of each of said nuts, slidably and lockably registering in said grooves and engaging with the helically disposed flange faces on the other of said nuts.

5. Locknuts of the kind described, comprising two separately, relatively rotatable nuts, having arcuate, substantially parallel circumferential grooves in the peripheries of said nuts, annular flanges around the peripheries of the adjacent faces of said nuts, helically disposed faces on one side of said flanges defining one side of said grooves, and separate wings on the periphery of each of said nuts, the ends of said wings on the periphery of each of said nuts registering in the grooves in the other of said nuts and being in slidable and locking engagement with the helically disposed sides of said flanges.

Signed at New York in the county and State of New York this 25th day of February, A. D. 1928.

JOSEPH KOZMA.